W. W. McKay. Gopher Trap.

No. 122,953.    Patented Jan. 23, 1872.

Witnesses:    Inventor:
A. W. Almquist    W. W. McKay.
Wm. H. C. Smith.
    Per
    Attorneys.

UNITED STATES PATENT OFFICE.

WILLIAM W. McKAY, OF FRANKVILLE, IOWA.

IMPROVEMENT IN GOPHER-TRAPS.

Specification forming part of Letters Patent No. 122,953, dated January 23, 1872.

*To all whom it may concern:*

Be it known that I, WILLIAM W. McKAY, of Frankville, in the county of Winneshiek and State of Iowa, have invented a new and Improved Gopher-Trap; and I do hereby declare that the following is a full, clear, and exact description thereof, which will enable others skilled in the art to make and use the same, reference being had to the accompanying drawing forming part of this specification.

My invention consists in constructing a trap that may be inserted lengthwise into the hole of the animal, as hereinafter fully described and subsequently pointed out in the claim.

Figure 1:
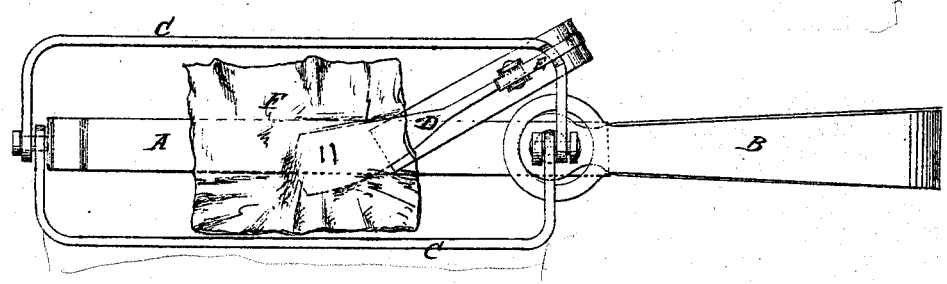
Figure 2:
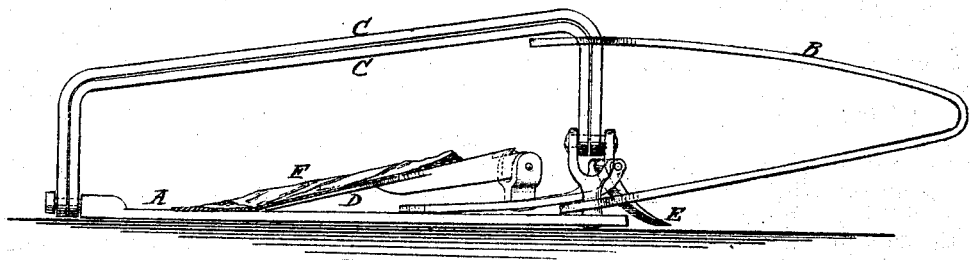

In the drawing, Figure 1 represents a trap, top view, constructed according to my invention, as set. Fig. 2 is a side view representing it as sprung.

Similar letters of reference indicate corresponding parts.

A is the trap-bar. B is the spring. C C represent the jaws.

To adapt the trap to gopher or other small animal-holes or burrows the trap is made long and narrow, so that it may be placed in the hole, and so that the sides of the hole will not interfere with the jaw when the trap springs.

D is the pan. E is the trigger. The trigger and springing mechanism is the same as that of the ordinary steel-trap, but arranged at the end of the trap so as to reduce the width for the purpose before mentioned. F is an apron over the pan.

In watching the habits of the gopher it is observed that, in coming to the light or from his burrow, he always pushes earth before him, so that the common trap is sprung before he reaches it, or is prevented from springing by the earth which would be forced under the pan. The elongated trap prevents the first result, and the covering over the pan prevents the last. As the trap is carefully covered in the hole the jaws are made to close past each other, so that earth will not be caught between them when the trap is sprung.

Having thus described my invention, I claim as new and desire to secure by Letters Patent—

1. In animal-traps, jaws C C, elongated, narrow, and closing past each other, as described, to prevent dirt from being caught between the closing jaws when the trap has been placed in the hole and covered with soil.

2. The bar A, spring B, jaws C C, pan D, trigger E, and cover F, when combined, as and for the purpose specified.

To the above specification of my invention I have signed my hand this 28th day of February, A. D. 1871.

W. W. McKAY.

Witnesses:
 JOHN McLOURY,
 J. M. HOISINGTON.